United States Patent
Shih et al.

(10) Patent No.: US 9,547,224 B2
(45) Date of Patent: Jan. 17, 2017

(54) PROJECTOR WITH A THERM-SENSITIVE COMPONENT FOR OVERHEATING PROTECTION

(71) Applicants: QISDA OPTRONICS (SUZHOU) CO., LTD., Suzhou, Jiangsu Province (CN); QISDA CORPORATION, Taoyuan County (TW)

(72) Inventors: Fu-Shiung Shih, Taoyuan County (TW); Chi-Jen Chen, Taoyuan County (TW); Fang-Chieh Lu, Taoyuan County (TW); Po-Fu Wu, Taoyuan County (TW); Chun-Jung Hu, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 129 days.

(21) Appl. No.: 14/445,073

(22) Filed: Jul. 29, 2014

(65) Prior Publication Data

US 2015/0077719 A1     Mar. 19, 2015

(30) Foreign Application Priority Data

Sep. 18, 2013   (TW) .............................. 102133926 A (51) Int. Cl.
  *G03B 21/16*    (2006.01)
  *H04N 9/31*     (2006.01)
  *G03B 21/20*    (2006.01)

(52) U.S. Cl.
  CPC ........... *G03B 21/16* (2013.01); *G03B 21/2086* (2013.01); *H04N 9/3144* (2013.01)

(58) Field of Classification Search
  CPC .... G03B 21/16; G03B 21/2086; H04N 9/3144
  See application file for complete search history.

(56) References Cited

U.S. PATENT DOCUMENTS

| 5,951,136 A * | 9/1999 | Furuhata | G03B 21/00 348/E5.141 |
| 6,203,158 B1 * | 3/2001 | Furuhata | G03B 21/00 348/E5.141 |

(Continued)

FOREIGN PATENT DOCUMENTS

| JP | H0378737 | 4/1991 |
| TW | 201106087 A1 | 2/2011 |

*Primary Examiner* — Bao-Luan Le (57) ABSTRACT

A projector includes an apparatus casing, a light source module, a flow generating device, a sensing module, and a power module. The light source module is disposed inside the apparatus casing and includes a light-emitting part and a lampshade surrounding the light-emitting part. The flow generating device can generate an air flow for dissipating heat by the light source module. The sensing module is disposed in the apparatus casing and includes a thermo-sensitive component disposed near the lampshade and located in a flowing path of the air flow. The power module is disposed in the apparatus casing and electrically connected to the light source module and the sensing module. The power module selectively stops powering the light source module according to an electric parameter of the thermo-sensitive component. Thereby, the invention protects the projector from being overheated by use of the thermo-sensitivity of the thermo-sensitive component.

15 Claims, 7 Drawing Sheets

(56) References Cited

U.S. PATENT DOCUMENTS

| | | | | |
|---|---|---|---|---|
| 7,294,979 B2* | 11/2007 | Beasley | ............... | G03B 21/16 |
| | | | | 315/158 |
| 7,448,759 B2* | 11/2008 | Fukano | ............... | H04N 5/74 |
| | | | | 348/748 |
| 7,458,690 B2* | 12/2008 | Childers | ............... | F21V 29/80 |
| | | | | 353/121 |
| 7,661,824 B2* | 2/2010 | Beasley | ............... | G03B 21/16 |
| | | | | 315/291 |
| 7,874,685 B2* | 1/2011 | Miyazawa | ............ | G03B 21/14 |
| | | | | 353/122 |
| 2004/0240207 A1 | 12/2004 | Takezawa | | |
| 2006/0012758 A1* | 1/2006 | Fukano | ............... | H04N 5/74 |
| | | | | 353/85 |
| 2006/0227561 A1* | 10/2006 | Childers | ............... | F21V 29/80 |
| | | | | 362/373 |
| 2006/0267521 A1* | 11/2006 | Beasley | ............... | G03B 21/16 |
| | | | | 315/309 |
| 2007/0024816 A1 | 2/2007 | Hsu | | |
| 2007/0109504 A1* | 5/2007 | Miyazawa | ............ | G03B 21/14 |
| | | | | 353/67 |
| 2008/0018257 A1* | 1/2008 | Beasley | ............... | G03B 21/16 |
| | | | | 315/112 |
| 2008/0116387 A1 | 5/2008 | Astley | | |
| 2009/0040765 A1* | 2/2009 | Van De Voorde | .... | F21S 48/325 |
| | | | | 362/294 |

\* cited by examiner

PROJECTOR WITH A THERM-SENSITIVE COMPONENT FOR OVERHEATING PROTECTION

BACKGROUND OF THE INVENTION

1. Field of the Invention

The invention relates to a projector, and especially relates to a projector having an overheating protection.

2. Description of the Prior Art

A common projector usually has a thermal breaker which can protect the projector under overheating from being damaged or brunt due to the overheating. Therefore, the thermal breaker is usually disposed near a hottest component inside the projector for a quick response to overheating. For the common projector, bulbs are usually the hottest components, so the thermal breaker is usually disposed near the bulb. However, the thermal breaker usually uses mechanical protection mechanism, of which the composition is complicated so that it is difficult to reduce the cost. Furthermore, the volume of the thermal breaker is usually larger than a normal electronic component, so a proper space is required for the thermal breaker to be disposed. In practice, the thermal breaker is usually installed in the projector independently from other electronic components, so the installation of the thermal breaker is inevitable.

SUMMARY OF THE INVENTION

An objective of the invention is to provide a projector. The project uses a thermo-sensitive component for achieving an overheating protection function and has advantages of a quick response, a small disposition space, and a lowered cost of disposition and installation.

According to an embodiment, a projector of the invention includes an apparatus casing, a light source module, a flow generating device, a sensing module, and a power module. The light source module is disposed in the apparatus casing and includes a light-emitting part and a lampshade surrounding the light-emitting part. The flow generating device is used for generating an air flow flowing through the apparatus casing and dissipating heat produced by the light source module. The sensing module is disposed in the apparatus casing and includes a thermo-sensitive component. The thermo-sensitive component is disposed adjacent to the lampshade and located in a flowing path of the air flow. The power module is disposed in the apparatus casing and electrically connected to the light source module and the sensing module. The power module selectively stops powering the light source module according to an electric parameter of the thermo-sensitive component.

According to another embodiment, a projector of the invention includes an apparatus casing, alight source module, a sensing module, and a power module. The projector has a projecting direction. The light source module is disposed in the apparatus casing and includes a light-emitting part and a lampshade surrounding the light-emitting part. The sensing module is disposed in the apparatus casing and includes a thermo-sensitive component. The thermo-sensitive component is disposed adjacent to the lampshade. The power module is disposed in the apparatus casing and electrically connected to the light source module and the sensing module. The power module includes a circuit board having an extension portion extending below the lampshade. The thermo-sensitive component is disposed above the extension portion. The power module selectively stops powering the light source module according to an electric parameter of the thermo-sensitive component. When the projector is in use, the apparatus casing is disposed on an operation plane substantially parallel to the projecting direction, and the thermo-sensitive component is located below the lampshade relative to the operation plane.

Therefore, the invention uses the thermo-sensitivity of the thermo-sensitive component to protect the projector from being overheated. Furthermore, the sensing module can be integrated into a current circuit board such as a circuit board of the power module or a system main board, which can further reduce the cost and enhance the reliability of product assembly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
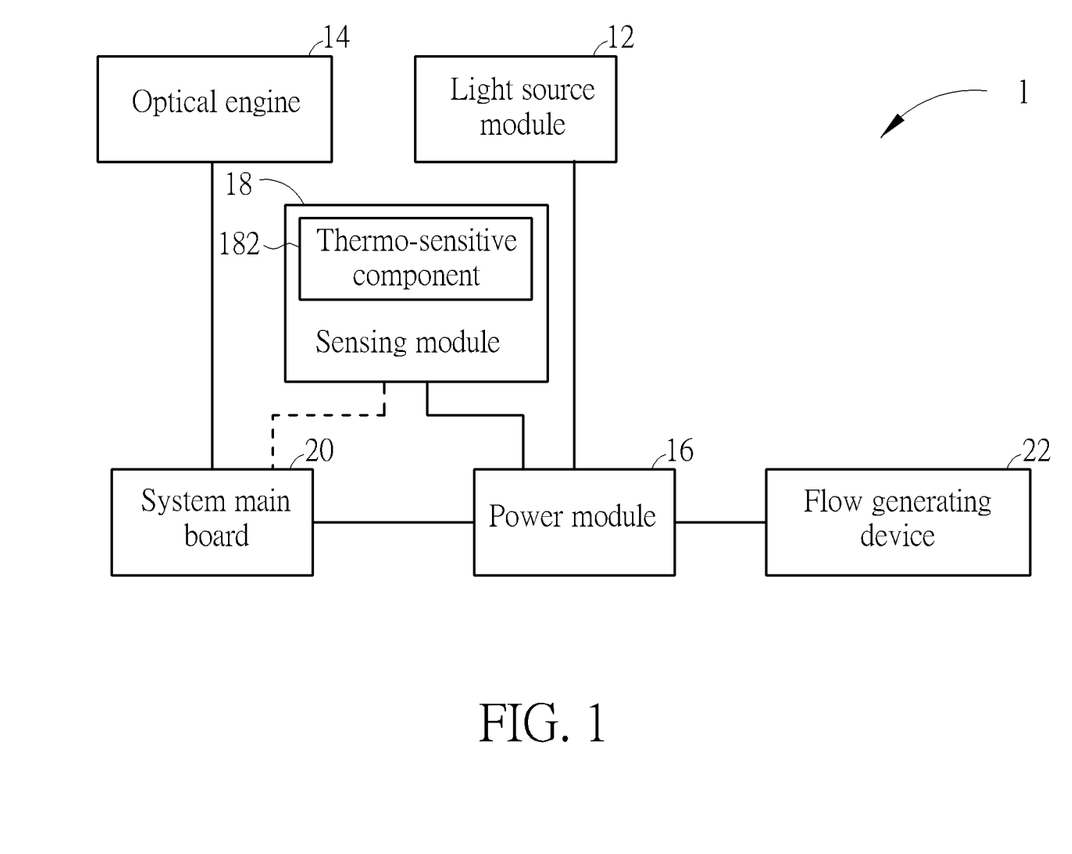
FIG. 1 is function block diagram of a projector of a preferred embodiment according to the invention.
Figure 2:
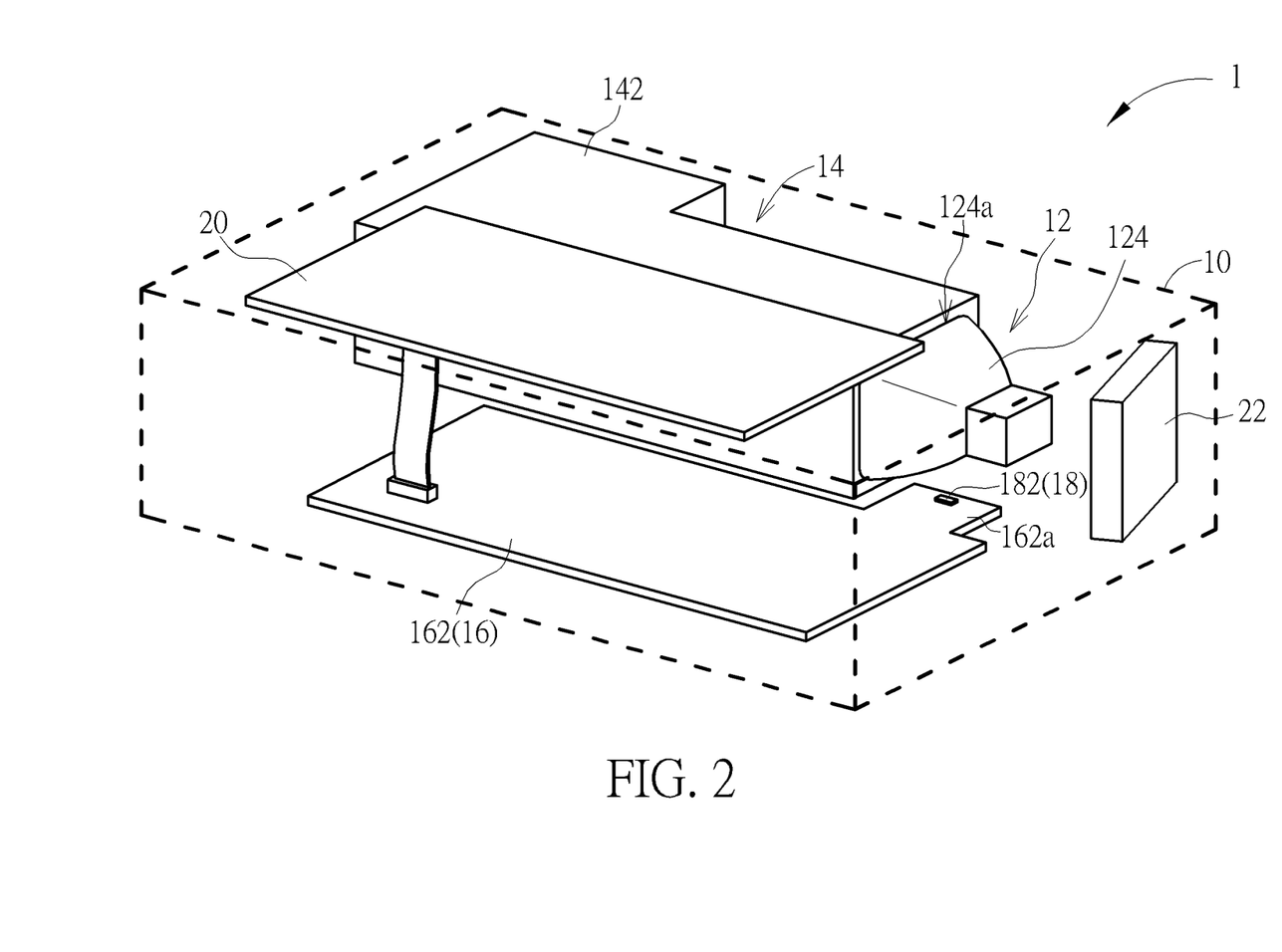
FIG. 2 is a schematic diagram illustrating the configuration of the projector in FIG. 1.
Figure 3:
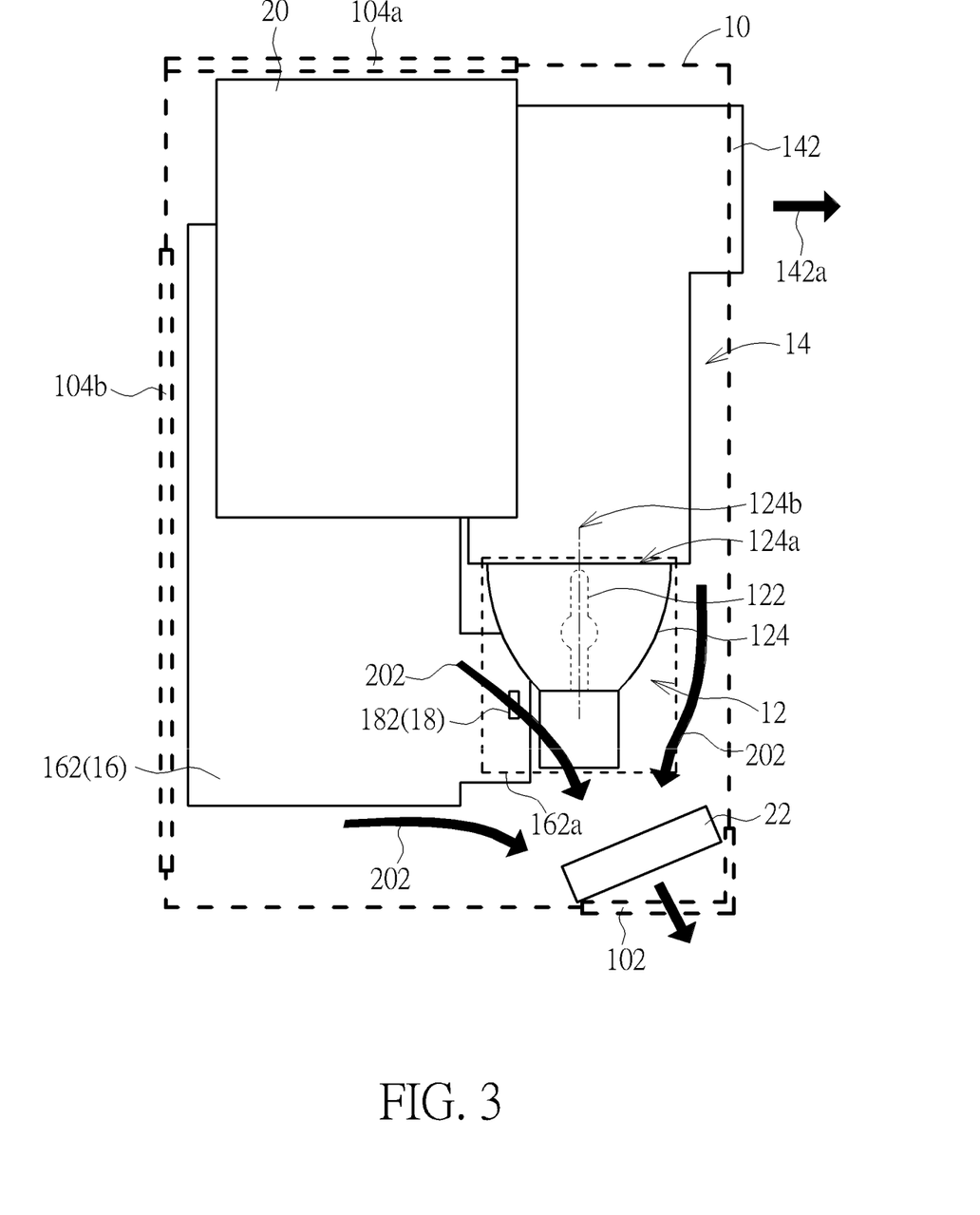
FIG. 3 is a top view of the projector in FIG. 2.
Figure 4:
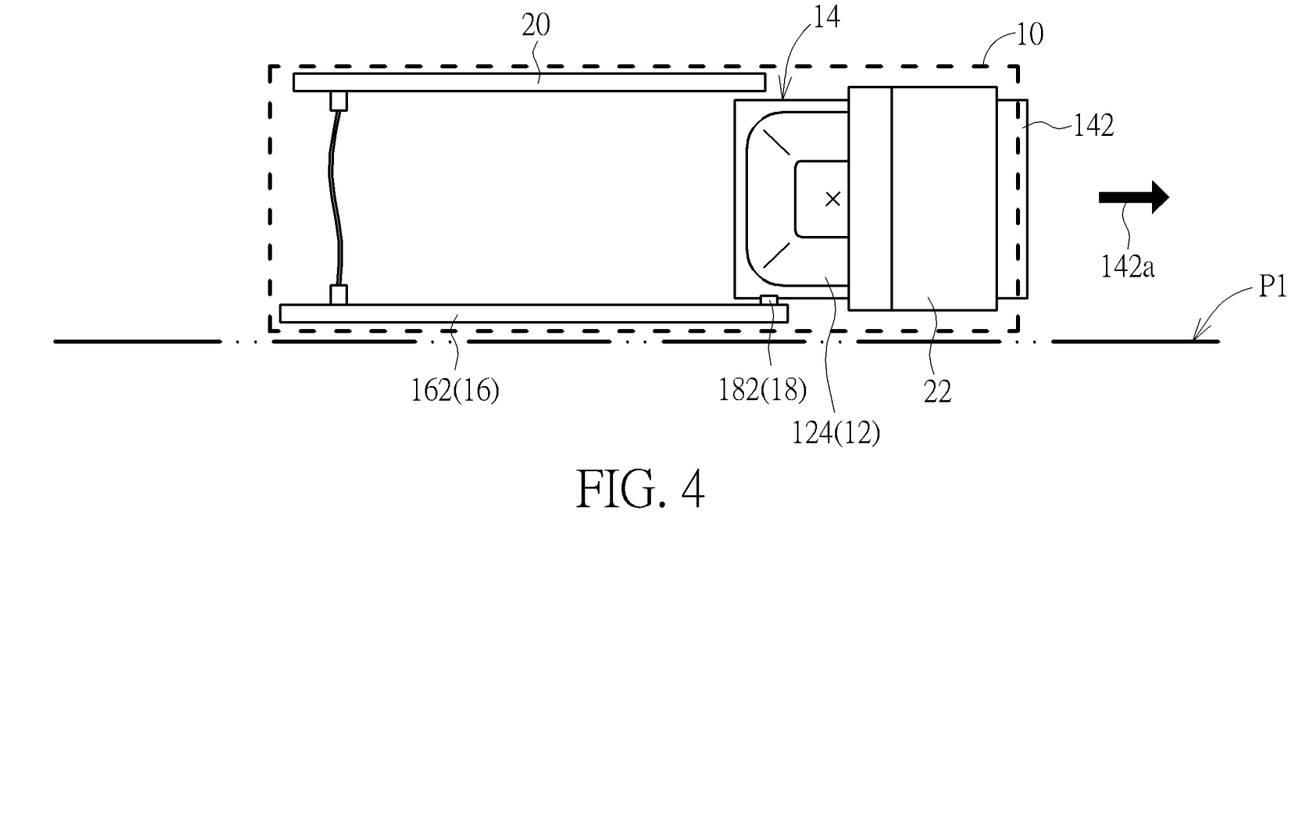
FIG. 4 is a rear view of the projector in FIG. 2.

Please refer to FIGS. 1 through 4. FIG. 1 is function block diagram of a projector 1 of a preferred embodiment according to the invention. FIG. 2 is a schematic diagram illustrating the configuration of the projector 1. FIG. 3 is a top view of the projector 1. FIG. 4 is a rear view of the projector 1. The projector 1 includes an apparatus casing 10 (shown in bold dashed lines) and a light source module 12 (shown in a dashed frame), an optical engine 14, a power module 16, a sensing module 18, a system main board 20, and an flow generating device 22 which are disposed in the apparatus casing 10. The system main board 20 is electrically connected to the optical engine 14 and the power module 16. A projection lens 142 of the optical engine 14 is exposed out of the apparatus casing 10 and projects images onto a screen in a projecting direction 142a. The light source module 12 is disposed adjacent to the optical engine 14 and provides the optical engine 14 with needed light. The light source module 12 is electrically connected to the power module 16 and includes a light-emitting part 122 and a lampshade 124 surrounding the light-emitting part 122. The lampshade 124 has an opening 124a. The lampshade 124 defines a center axis 124b (shown in a center line in FIG. 3). Light emitted by the light-emitting part 122 travels out the lampshade 124 from an opening 124a of the lampshade 124 substantially parallel to the center axis 124b and enters the optical engine 14. The sensing module 18 includes a thermo-sensitive component 182. The thermo-sensitive component 182 is disposed adjacent to the lampshade 124. The flow generating device 22 is disposed substantially at a corner inside the apparatus casing 10 and can generate an air flow flowing through the apparatus casing. The air flow can dissipate heat produced by the electronic components of the projector 1, especially by the light source module 12. According to an electric parameter of the thermo-sensitive component 182, the power module 16 selectively stops powering the light source module 12, for example keeping on powering or stopping powering, so that the projector 1 can be protected from overheated.

Further, because the thermo-sensitive component 182 is sensitive to temperature, when the light source module 12 produces much heat, produced heat cannot be dissipated, or produced heat cannot be dissipated in time, the electric parameter of the thermo-sensitive component 182 will change. Then, the power module 16 selectively stops powering the light source module 12 according to an electric parameter of the thermo-sensitive component 182. In the embodiment, the flow generating device 22 is a fan for draining fluid (such as air) from the interior of the apparatus casing 10. The apparatus casing 10 has an outlet 102 (shown in a thin dashed frame in FIG. 2) and at least one inlets 104a and 104b (of which the disposition area is indicated by a thin dashed frame in FIG. 2). The flow generating device 22 is disposed in the apparatus casing 10 corresponding to the outlet 102. Air outside the apparatus casing 10 enters the apparatus casing 10 through the inlets 104a and 104b. Air inside the apparatus casing 10 is drained out through the outlet 102 by the flow generating device 22. Therein, flowing paths 202 (indicated by a bold arrow) of an air flow generated by the flow generating device 22. The thermo-sensitive component 182 is located in one of the flowing paths 202 of the air flow, so when the performance of the flow generating device 22 decreases (for example leading to insufficient heat dissipation) or fails (for example leading to no heat dissipation), the thermo-sensitive component 182 can rapidly respond so that the power module 16 can stop powering the light source module 12 in time and the light source module 12 (especially the light-emitting part 122) is therefore protected. However, the invention is not limited thereto. In the embodiment, the lampshade 124 is structurally symmetrical relative to the light-emitting part 122. The center axis 124b can be defined as an optical axis of the light source module 12 and located between the thermo-sensitive component 182 and the flow generating device 22. Furthermore, in practice, the thermo-sensitive component 182 is a thermistor, for example a thermistor of negative temperature coefficient or Positive temperature coefficient. The electric parameter of the thermo-sensitive component 182 for the operation basis of the power module 16 is an electric conductance accordingly. However, the invention is not limited thereto.

Figure 5:
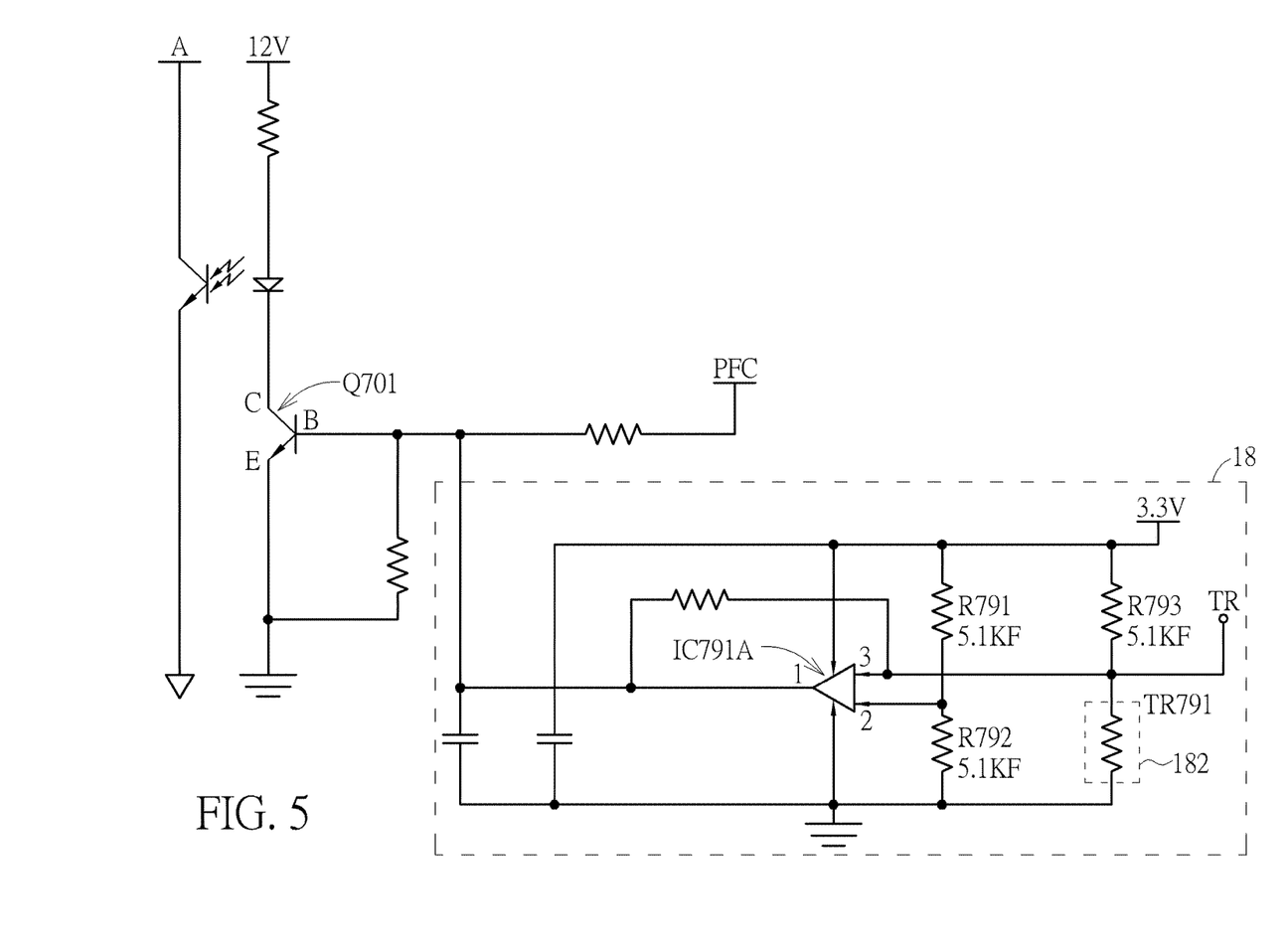
FIG. 5 is a circuit diagram of a partial circuit of a power module integrating a sensing module in the projector in FIG. 2.

In addition, in the embodiment, the power module 16 includes a circuit board 162. The thermo-sensitive component 182 is disposed directly on the circuit board 162, so the installation of the thermo-sensitive component 182 is also completed when the power module 16 is installed. In the embodiment, the circuit board 162 has an extension portion 162a extending into the space under the lampshade 124. The thermo-sensitive component 182 is disposed on the extension portion 162a. In this configuration, the thermo-sensitive component 182 is disposed more close to the lampshade 124, which enhances the thermal sensitivity of the thermo-sensitive component 182 to the light source module 12. Furthermore, in practice, the sensing module 18 can be integrated directly into the power module 16 further, which can be achieved as shown by FIG. 5. FIG. 5 is a circuit diagram of a partial circuit of the power module 16 integrating the sensing module 18. Therein, a voltage divider circuit formed by components R791 and R792 is coupled to a negative input end (i.e. the pin 2) of a comparator IC791A for a reference voltage. A component TR791 is a thermistor of negative temperature coefficient (i.e. the thermo-sensitive component 182). Another voltage divider circuit is formed by the component TR791 and a component R793 and is coupled to a positive input end (i.e. the pin 3) of the comparator IC791A for a detecting voltage. In normal statuses, PFC is at a high voltage level. The resistance of the component TR791 is much larger than the resistance of the component R792, so an output end (i.e. the pin 1) of the comparator IC791A is also at a high voltage level. A transistor Q701 is on, PFC is enabled. When an abnormal status occurs, for example the temperature continuously rising, the resistance of the component TR791 will continuously decrease. When the resistance of the component TR791 is lower than the resistance of the component R792, the voltage of the positive input end (i.e. the pin 3) of the comparator IC791A is lower than the voltage of the negative input end (i.e. the pin 2). At this moment, the output end (i.e. the pin 1) of the comparator IC791A is switched to a low voltage level, so that the transistor Q701 is switched off, and PFC is disenabled. The power module 16 will not supply power to the light source module 12. Accordingly, the overheating protection is achieved.

Figure 6:
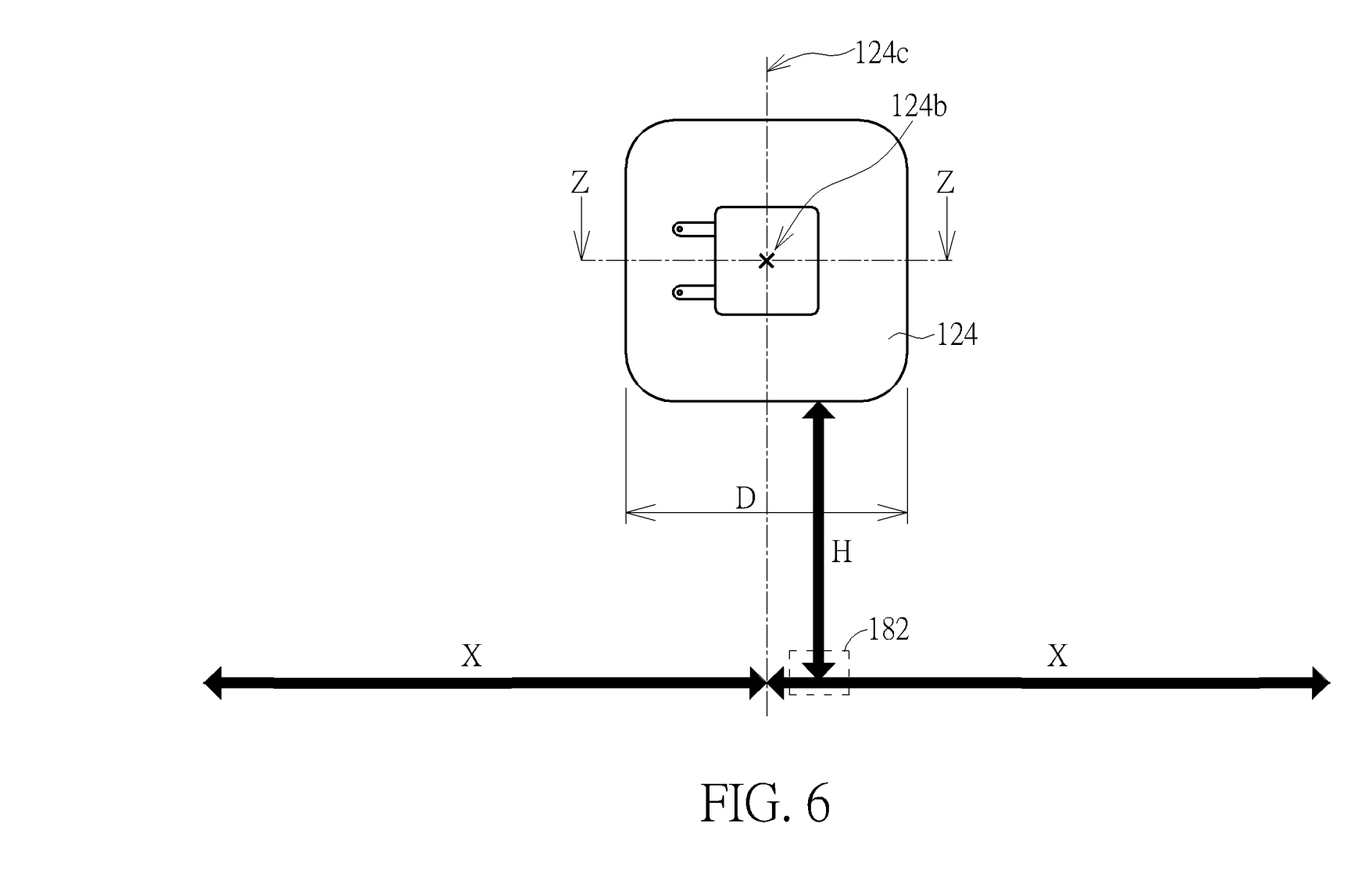
FIG. 6 is a schematic diagram illustrating the disposition of a thermo-sensitive component on a plane perpendicular to a center axis relative to a lampshade in the projector in FIG. 2.
Figure 7:
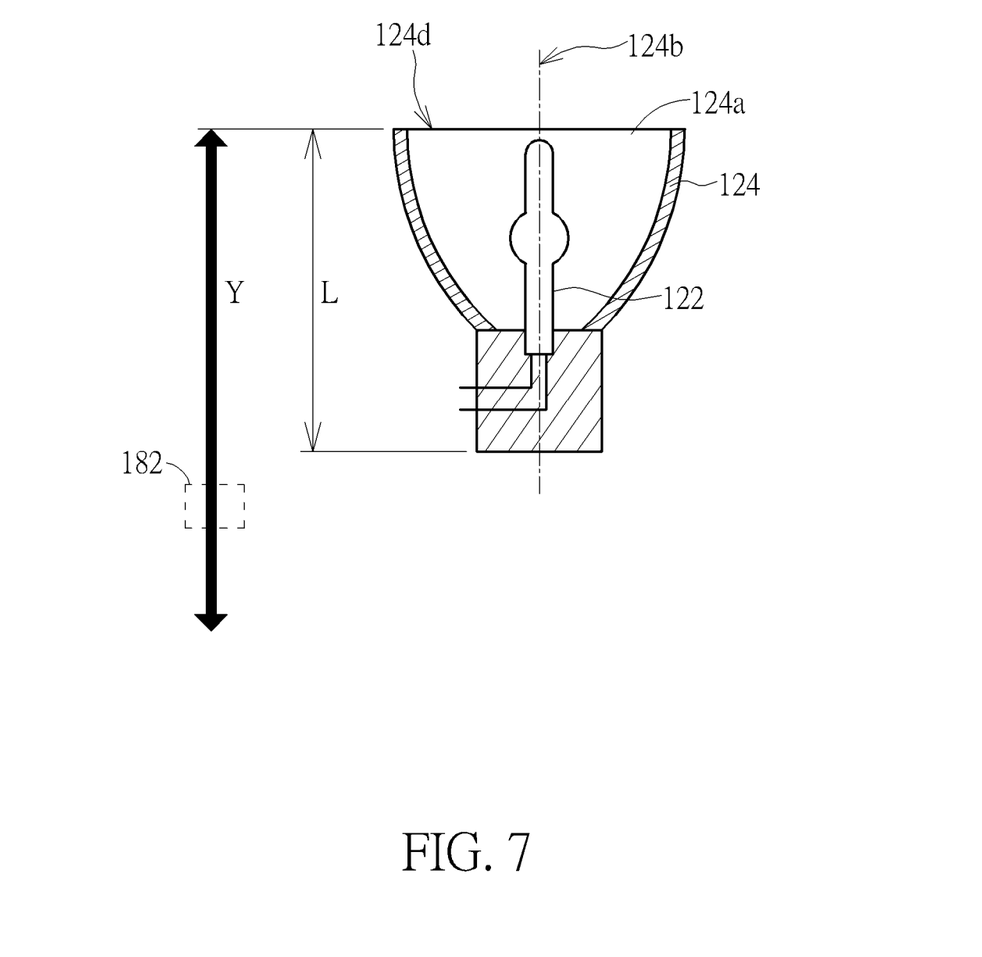
FIG. 7 is a schematic diagram illustrating the disposition of the thermo-sensitive component on a plane parallel to the center axis relative to the lampshade in the projector in FIG. 2.

Please refer to FIGS. 2, 3, 6 and 7. FIG. 6 is a schematic diagram illustrating the disposition of the thermo-sensitive component 182 on a plane perpendicular to the center axis 124b relative to the lampshade 124. FIG. 7 is a schematic diagram illustrating the disposition of the thermo-sensitive component 182 on a plane parallel to the center axis 124b relative to the lampshade 124. Therein, the above planes are reference planes for convenience of illustrating relative positions, not specific flat surfaces of physical objects. For the convenience of understanding the relative disposition of the thermo-sensitive component 182 and the lampshade 124, the drawing of FIG. 6 itself can be regarded as the plane perpendicular to the center axis 124b; the drawing of FIG. 7 itself can be regarded as the plane parallel to the center axis 124b. In practice, the protection of the light source module 12 by sensing the temperature of the lampshade 124 is not limited to attaching the thermo-sensitive component 182 directly on the lampshade 124. In principle, the temperature of the atmosphere around the lampshade 124 has a relationship with the temperature of the lampshade 124, so the invention is not limited to attaching the thermo-sensitive component 182 directly on the lampshade 124. In the embodiment, a disposition area for the disposition position of the thermo-sensitive component 182 relative to the lampshade 124 can be determined on through experiments; therein, the thermo-sensitive component 182 can respond to the temperature of the lampshade 124 preferably when disposed with the disposition area. As shown by FIG. 6, a projection profile (shown by a rear view of the lampshade 124 for convenience) of the lampshade 124 on the plane perpendicular to the center axis 124b (of which the projection position is indicated by a cross marked) has an outer diameter D. A distance H between a projection of the thermo-sensitive component 182 (shown by a dashed frame in the figure) on the plane and the projection profile is from 0 to 1 time the outer diameter D. Furthermore, the projection profile is structurally symmetrical relative to a symmetry axis 124c. A distance X between the projection of the thermo-sensitive component 182 on the plane and the symmetry axis 124c is from 0 to 2 times the outer diameter D.

Similarly, as shown by FIG. 7, a projection profile (in which the lampshade 124 is shown in a top cross-sectional view for convenience, of which the position of the cutting plane can be is indicated by the line Z-Z in FIG. 6) of the lampshade 124 on the plane parallel to the center axis 124b has a length L. The projection profile has a reference edge 124d corresponding to the opening 124a. The reference edge 124d is perpendicular to the center axis 124b. A distance Y from the reference edge 124d to a projection of the thermo-sensitive component 182 (shown by a dashed frame in the figure) on the plane in a direction reverse to an opening direction (i.e. the direction in which the light is emitted) of the opening 124a is from 0 to 1.5 times the length L.

Please refer back to FIG. 4. In the embodiment, when the projector is in use, the apparatus casing 10 is disposed on an operation plane P1 (indicated by a chained line in the figure) substantially parallel to the projecting direction 142a. The thermo-sensitive component 182 is located above or below the lampshade 124 relative to the operation plane P1 (for example for the lampshade 124 being hanged on a ceiling or put on a table respectively). In practice, the thermo-sensitive component 182 can be disposed right above or right under the lampshade 124 by a design of the extension portion 162a. In addition, in the embodiment, the thermo-sensitive component 182 is disposed directly on the circuit board 162 of the power module 16, but the invention is not limited thereto. In practice, the thermo-sensitive component 182 can be disposed on the system main board 20 (of which the electrical connection is indicated by dashed lines in FIG. 1) alternatively. Because the system main board 20 and the power module 16 are electrically connected, when the electric parameter of the thermo-sensitive component 182 varies, and the power module 16 also can respond through the system main board 20 and selectively stops powering the light source module 12. In such case, the projector 1 is disposed on a table for use; the thermo-sensitive component 182 is disposed above the lampshade 124. It is added that in practice, the thermo-sensitive component 182 may has different disposition positions relative to the lampshade 124 corresponding to different disposition positions of the circuit board 162 of the power module 16 or the system main board 20, which can be understood and practiced by a person having ordinary skill in the art according to the disclosure of the invention and will not be described one by one.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector, comprising:
an apparatus casing;
a light source module, the light source module being disposed in the apparatus casing and comprising a light-emitting part and a lampshade surrounding the light-emitting part;
a flow generating device for generating an air flow, the air flow flowing through the apparatus casing and dissipating heat produced by the light source module;
a sensing module, the sensing module being disposed in the apparatus casing and comprising a thermo-sensitive component, the thermo-sensitive component being disposed adjacent to the lampshade and being located in a flowing path of the air flow; and
a power module, the power module being disposed in the apparatus casing and electrically connected to the light source module and the sensing module, the power module selectively stopping powering the light source module according to an electric parameter of the thermo-sensitive component;
wherein the power module comprises a circuit board, the thermo-sensitive component is disposed on the circuit board, the sensing module is integrated into the power module and comprises a first voltage divider circuit, a second voltage divider circuit, and a comparator, the first voltage divider circuit is formed by a first component and a second component, the second voltage divider circuit is formed by a third component and the thermo-sensitive component, the comparator comprises a first pin, a second pin, and a third pin, the first pin is an output end of the comparator, the first voltage divider circuit is coupled to the second pin, and the second voltage divider circuit is coupled to the third pin;
wherein when a resistance of the thermo-sensitive component is larger than a resistance of the second component, the output end of the comparator is at a high voltage level, and the power module powers the light source module;
wherein when the resistance of the thermo-sensitive component is lower than the resistance of the second component, the output end of the comparator is at a low voltage level, and the power module does not power the light source module.

2. The projector of claim 1, wherein the thermo-sensitive component is a thermistor.

3. The projector of claim 1, wherein the lampshade defines a center axis, light emitted by the light-emitting part travels out the lampshade substantially parallel to the center axis, the lampshade has a projection profile on a plane perpendicular to the center axis, the projection profile has an outer diameter, and a distance between a projection of the thermo-sensitive component on the plane and the projection profile is from 0 to 1 time the outer diameter.

4. The projector of claim 3, wherein the projection profile is symmetrical to a symmetry axis, and a distance between the projection of the thermo-sensitive component on the plane and the projection profile is from 0 to 2 times the outer diameter.

5. The projector of claim 1, wherein the lampshade defines a center axis, light emitted by the light-emitting part travels out the lampshade from an opening of the lampshade substantially parallel to the center axis, the lampshade has a projection profile on a plane parallel to the center axis, the projection profile has a length in a direction parallel to the center axis, the projection profile has a reference edge corresponding to the opening, and a distance from the reference edge to a projection of the thermo-sensitive component on the plane in a direction reverse to an opening direction of the opening is from 0 to 1.5 times the length.

6. The projector of claim 1, wherein the light source module defines an optical axis, and the optical axis is located between the thermo-sensitive component and the flow generating device.

7. The projector of claim 1, wherein the projector has a projecting direction, when the projector is in use, the apparatus casing is disposed on an operation plane substantially parallel to the projecting direction, and the thermo-sensitive component is located above or below the lampshade relative to the operation plane.

8. The projector of claim 7, wherein the circuit board has an extension portion extending below the lampshade, and the thermo-sensitive component is disposed above the extension portion and right under the lampshade.

9. A projector, the projector having a projecting direction, the projector comprising:
an apparatus casing;
a light source module, the light source module being disposed in the apparatus casing and comprising a light-emitting part and a lampshade surrounding the light-emitting part;
a sensing module, the sensing module being disposed in the apparatus casing and comprising a thermo-sensitive component, the thermo-sensitive component being disposed adjacent to and right under the lampshade; and
a power module, the power module being disposed in the apparatus casing and electrically connected to the light source module and the sensing module, the power module comprising a circuit board, the circuit board having an extension portion extending below the lampshade, the thermo-sensitive component being disposed above the extension portion, the power module selectively stopping powering the light source module according to an electric parameter of the thermo-sensitive component;
wherein when the projector is in use, the apparatus casing is disposed on an operation plane substantially parallel to the projecting direction, and the thermo-sensitive component is located below the lampshade relative to the operation plane;
wherein the sensing module is integrated into the power module and comprises a first voltage divider circuit, a second voltage divider circuit, and a comparator, the first voltage divider circuit is formed by a first component and a second component, the second voltage divider circuit is formed by a third component and the thermo-sensitive component, the comparator has a first pin, a second pin, and a third pin, the first pin is an output end of the comparator, the first voltage divider circuit is coupled to the second pin, the second voltage divider circuit is coupled to the third pin, when a resistance of the thermo-sensitive component is larger than a resistance of the second component, the output end of the comparator is at a high voltage level and the power module powers the light source module, and when the resistance of the thermo-sensitive component is lower than the resistance of the second component, the output end of the comparator is at a low voltage level and the power module does not power the light source module.

10. The projector of claim 9, wherein the thermo-sensitive component is a thermistor.

11. The projector of claim 9, wherein the lampshade defines a center axis, light emitted by the light-emitting part travels out the lampshade substantially parallel to the center axis, the lampshade has a projection profile on a plane perpendicular to the center axis, the projection profile has an outer diameter, and a distance between a projection of the thermo-sensitive component on the plane and the projection profile is from 0 to 1 time the outer diameter.

12. The projector of claim 11, wherein the projection profile is symmetrical to a symmetry axis, and a distance between the projection of the thermo-sensitive component on the plane and the projection profile is from 0 to 2 times the outer diameter.

13. The projector of claim 9, wherein the lampshade defines a center axis, light emitted by the light-emitting part travels out the lampshade from an opening of the lampshade substantially parallel to the center axis, the lampshade has a projection profile on a plane parallel to the center axis, the projection profile has a length in a direction parallel to the center axis, the projection profile has a reference edge corresponding to the opening, and a distance from the reference edge to a projection of the thermo-sensitive component on the plane in a direction reverse to an opening direction of the opening is from 0 to 1.5 times the length.

14. The projector of claim 9, further comprising a flow generating device for generating an air flow, wherein the air flow flows through the apparatus casing and dissipates heat produced by the light source module, and the thermo-sensitive component is located in a flowing path of the air flow.

15. The projector of claim 14, wherein the light source module defines an optical axis, and the optical axis is located between the thermo-sensitive component and the flow generating device.

* * * * *